United States Patent
Michelson

[11] Patent Number: 5,912,946
[45] Date of Patent: Jun. 15, 1999

[54] METHOD FOR DETECTING IMPROPER DELIVERY OF PARAMETERS, IN AN INITIAL ADDRESS MESSAGE, FROM AN INTERCONNECTING SWITCH

[75] Inventor: Steven M. Michelson, Freehold, N.J.

[73] Assignee: AT&T Corp., Middletown, N.J.

[21] Appl. No.: 08/933,778

[22] Filed: Sep. 19, 1997

[51] Int. Cl.⁶ .......................... H04M 1/24; H04M 3/08; H04M 7/00
[52] U.S. Cl. ..................... 379/1; 379/9; 379/14; 379/12; 379/22; 379/26; 379/229; 379/231; 379/18
[58] Field of Search .................... 379/1, 2, 9, 10, 379/12, 14–15, 18, 22, 23, 25–26, 34, 229, 230, 231–232, 242, 243–247, 258, 127, 120, 142

[56] References Cited

U.S. PATENT DOCUMENTS

| | | | |
|---|---|---|---|
| 5,473,677 | 12/1995 | D'Amato et al. | 379/112 |
| 5,521,902 | 5/1996 | Ferguson | 379/13 |
| 5,546,450 | 8/1996 | Suthard et al. | 379/207 |
| 5,579,371 | 11/1996 | Aridas et al. | 379/34 |
| 5,590,171 | 12/1996 | Howe et al. | 379/33 |
| 5,592,530 | 1/1997 | Brockman et al. | 379/15 |
| 5,680,437 | 10/1997 | Segal | 379/10 |
| 5,712,908 | 1/1998 | Brinkman et al. | 379/112 |
| 5,726,972 | 3/1998 | Ferguson | 379/23 |
| 5,787,147 | 7/1998 | Gundersen | 379/10 |
| 5,802,144 | 9/1998 | Laird et al. | 379/1 |
| 5,802,145 | 9/1998 | Farris et al. | 379/1 |
| 5,802,146 | 9/1998 | Dulman | 379/34 |
| 5,809,121 | 9/1998 | Elliott et al. | 379/229 |
| 5,854,824 | 12/1998 | Bengal et al. | 379/22 |

Primary Examiner—Curtis A. Kuntz
Assistant Examiner—Rexford N. Barnie

[57] ABSTRACT

A method for detecting improper delivery of parameters in an initial address message (IAM), such as a calling party number (CPN), for calls set up to a switch over SS7 trunk groups connected to other carriers is described. When a call originates from a switch other than the local switch serving a caller ID customer, the CPN should be passed, as a parameter in a call setup message called an Initial Address Message (IAM), from the originating switch to any intermediate switches, and from those intermediate switches to the customer's terminating switch. The method allows a switch to reliably and proactively identify when an IAM parameter, such as CPN, is not being received (and should be), from an interconnecting switch, for calls over specific TSGs connecting two switches.

10 Claims, 2 Drawing Sheets

METHOD FOR DETECTING IMPROPER DELIVERY OF PARAMETERS, IN AN INITIAL ADDRESS MESSAGE, FROM AN INTERCONNECTING SWITCH

FIELD OF THE INVENTION

The present invention relates to a method for detecting improper delivery of parameters in an initial address message (IAM), such as a calling party number (CPN), and, in particular, a method for detecting improper delivery of a CPN for calls set up to a switch over SS7 trunk groups connected to other carriers.

BACKGROUND OF THE INVENTION

Caller ID, or Caller Identification Service, is a telecommunications service which allows the recipient of a call (i.e., the called party) to identify the party originating a call (i.e., the calling party) before answering the telephone. Conventionally, the information provided to the called party includes the date and time of the call and the caller's telephone number. Caller ID service provides several benefits. First, the identification of the calling party allows the called party to screen an incoming call before its completion, thereby allowing the called party to decide whether or not it is desirable to answer the call. In this way, nuisance calls, such as solicitation, advertising or harassment calls, can be avoided.

Prior to the implementation of Signaling System 7, or simply SS7, identifying information of a calling party making a call was unknown beyond the first telephone company switching system that handled the calling party's telephone service. SS7 signaling technology made practical passing forward a calling party's telephone number to the destination of the call.

In operation, essentially, a data message, preceded by a channel seizure signal, is sent in conjunction with the ringing signal from the central office to the called party during a silent interval after the first 20 Hz, 2 second ringing phase. A detailed description of the method and apparatus for sending the data message may be found in U.S. Pat. No. 4,551,581 issued to Doughty on Nov. 5, 1985.

A customer who subscribes to the Caller ID service has a piece of equipment, known as a caller ID box, located at the customer premises. When the customer receives a call, information is transmitted from the customer's local switch to the caller ID box between the first and second rings. The information transmitted is known as the CPN, and identifies the telephone number associated with the line originating the call, if the CPN is not coded as "presentation restricted." In addition, the date and time of the call are transmitted to the caller ID box during the same interval of time, between the first and second rings. When a call originates from a switch other than the local switch serving the caller ID customer, the CPN should be passed from the originating switch to any intermediate switches, and from those intermediate switches to the customer's terminating switch. This CPN is passed as a parameter in a call setup message called an Initial Address Message (IAM) which is carried over SS7 Networks. If the calling party designates a call as "private," the CPN should still be passed with the coding of "presentation restricted." At the terminating switch, if the received CPN is encoded as "presentation restricted," the switch signals to the caller ID box that the call has been marked "private" or "anonymous."

While the ANSI standards for SS7 identify the CPN as an optional parameter in the IAM, an FCC document, "Rules and Policies Regarding Calling Number Identification Service—Caller ID," CC Docket No. 91-281, requires that "common carriers using Common Channel Signaling System 7 (SS7) and subscribing to or offering any service based on SS7 functionality must transmit the calling party number parameter and its associated privacy indicator on an interstate call to connecting carriers." Despite this FCC mandate, there are recently documented cases in which the CPN was not being transmitted, and, in particular, where AT&T was not receiving the CPN from switches owned by Local Exchange Carriers (LECs). As noted above however, the FCC mandate applies only to common carriers. If a privately-owned PBX is connected to a LEC switch via a Primary Rate Interface, the FCC does not mandate that the CPN be passed from the PBX to the LEC. In that case, the LEC can not pass the CPN to a connecting carrier, even if it does have SS7 connectivity. Additional possibilities as to when the CPN may not be passed are described below.

Prior to the deployment of SS7 signaling, Multi-Frequency (MF) signaling, an earlier form of signaling that does not have the capability to pass CPN between switching systems, was used to set up calls between switching systems. Some switching systems have not yet been converted from MF to SS7 signaling. Therefore, in some situations one or more legs of a call may be set up using SS7 signaling, while other legs may use MF signaling. To allow backward compatibility, an interworking function was defined to allow calls to be set up using SS7, where available, even if SS7 is not fully deployed on every switch carrying a leg of the call. However, whenever a call progresses to a point at which MF, rather than SS7 signaling occurs, some information is lost. Of particular importance for the present invention is the loss of the CPN information. To identify when a call entering a switch via SS7 signaling has encountered MF interworking at some point prior to the current leg, the "Forward Call Indicators" parameter in the IAM is coded to indicate that MF interworking was encountered.

There are situations where, due to technical reasons (e.g., MF interworking), due to policy reasons (e.g., a privately-owned PBX owner choosing not to pass CPN), or, due to equipment or provisioning problems at an originating or intermediate switch, the CPN is not delivered, or can not be delivered. Various problems which could result in a failed transmission of the CPN include: provisioning errors that occur when adding new trunk sub-groups (TSGs), new switches, new SS7 signaling capabilities in existing switches, new software, or other simple human error made in an existing switch during a provisioning change. In any event, if one of these problems causes a failed delivery of the CPN to the terminating switch, the caller ID customer will not receive information for all calls originating from, or connected through, a problematic switch or traversing a problematic TSG. From the standpoint of a caller ID subscriber, the caller ID service provides its advantages only if it is consistent and reliable for a large majority of incoming calls. In addition, the universal delivery of CPN greatly enhances the ability of law enforcement to trace calls when criminal activity is involved. It is therefore desirable to maximize the number of cases in which a CPN is delivered.

SUMMARY OF THE INVENTION

Accordingly, one object of the present invention is to provide a method which allows a switch to reliably and proactively identify when a CPN is not being received (and should be), from an interconnecting switch, for calls over specific TSGs connecting two switches. The reason for performing this method on a TSG basis is because the major switching system manufacturers have implemented the capability to turn CPN delivery on or off at the TSG (or equivalent) level. The invention is designed to ignore legitimate reasons for non-delivery of CPN, while detecting correctable problems. Therefore, the method for detecting CPN delivery problems includes steps that allow it to ignore cases when MF interworking occurs, or when a privately-owned PBX is not passing CPN.

Another object of the invention is to provide a method for identifying problems within one's own network, by identifying that a CPN is not being passed from one network switch to another.

The above and other objects of the invention are satisfied in part by determining that an interconnecting switch is not passing a CPN for calls set up to a switch over an SS7 trunk, by examining additional information in a received IAM, and by applying various steps using the additional information so as to determine whether the CPN has been properly delivered.

Additional objects and advantages of the present invention will become readily apparent to those skilled in the art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

DETAILED DESCRIPTION

A. Overview of the Illustrative System

Figure 1:
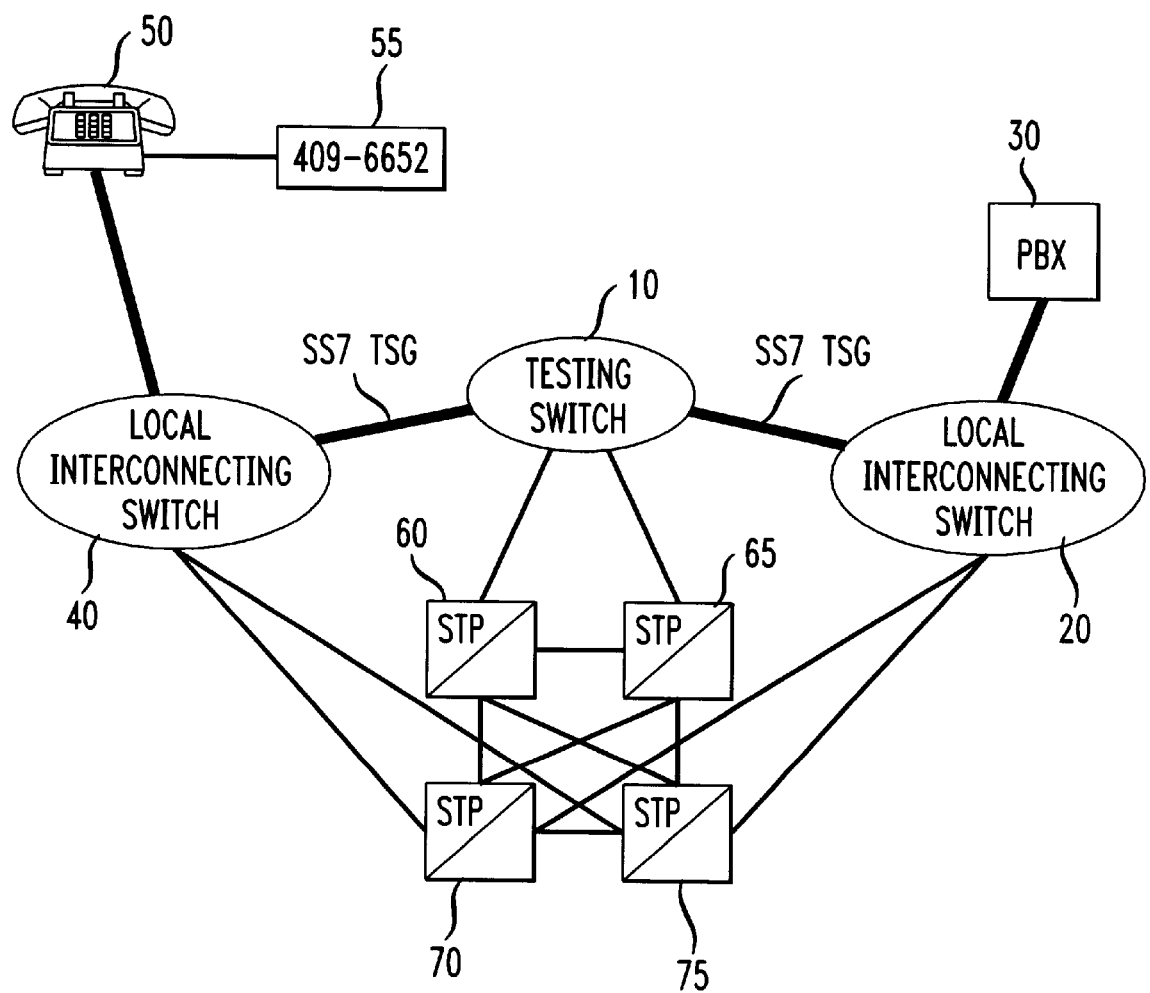
FIG. 1 presents a block diagram of an illustrative system having cooperating elements performing in accordance with the present invention.

FIG. 1 depicts an illustrative system which may employ the invention, specifically, a common channel signaling network using the SS7 protocol (note that there are ANSI standards for the SS7 protocol used to setup calls and to pass CPNs; in addition, Bellcore requirements define how the SS7 protocol is used to support caller ID services in a telephone network). In accordance with the application of the present invention, a testing switch (e.g. 4ESS™), local interconnecting switches, a locally-owned PBX, and, signaling transfer points (STPs, which examine each received signaling message to determine its destination and route the message to the appropriate destination), are shown. For many reasons, one or more switches connected to a switched network, such as the AT&T Switched Network (ASN), may not pass various parameters, in particular, CPNs, in accordance with requirements. In order to detect which particular interconnecting switches are not forwarding the CPNs (and should be), the method described in detail below accurately determines if calls originating over a particular TSG are not forwarding CPNs and outputs failure reports for those TSGs detected as faulty. This process effectively examines information in all initial address messages (IAMs) received from each switch from which the calls originate over a given interval of time (sometimes referred to as a soaking period). This process allows the system to flag any transfer of CPN problems in both interconnecting switch networks and within its own network.

The block diagram of FIG. 1 provides an illustrative system, including a 4ESS™ testing switch, in which the method of detecting improper delivery of a CPN from a local interconnecting switch in accordance with the present invention, may be incorporated. As shown in FIG. 1, the system includes testing switch 10, local interconnecting switch 20, a privately-owned PBX 30, local interconnecting switch 40, a telephone 50 with display device 55, STPs 60 and 65, and STPs 70 and 75. Obviously a plurality of local interconnecting switches may be connected to testing switch 10, but only two are shown for illustration purposes. Essentially, a CPN is either generated at local interconnecting switch 20 when a call originates from a line served by the switch, or, when a CPN is generated at the PBX 30 when a call originates from a station served by the PBX, if the PBX owner has chosen to transmit CPN. In the latter case, the CPN is received at the local interconnecting switch 20 if the connection to the PBX 30 supports it. The local interconnecting switch 20 is connected to the testing switch 10 (a 4ESS™ switch) by an SS7 trunk, and may or may not forward the CPN to that switch.

2. Proposed Method for Detecting Improper CPN Delivery

The proposed method reliably detects when an adjacent switch is not properly delivering a CPN. The method monitors IAMs for calls originating over a particular TSG and determines whether a CPN has been correctly delivered by an adjacent switch by examining the IAMs sent from the adjacent switch, and by setting a Boolean indication to TRUE when an IAM containing a CPN arrives for a call over a particular TSG. To ensure reliability, and to avoid counting calls for which it is not technically possible to receive a CPN, the system examines only IAMs that have not encountered MF interworking. The system also employs a soaking period, which allows a time period for traffic originating from many different sources to be routed over the particular TSG. This soaking period is used to minimize the chance of concluding that the TSG is provisioned incorrectly, when CPN delivery problems are occurring at another switch or PBX. Once the system determines that a CPN is passed for a call originating over the particular TSG, the method no longer examines IAMs for calls over that TSG until the soaking period has expired, and a new period has begun. The conclusion in this case is that if a CPN is received in a single IAM for a call over a TSG, then the provisioning for the TSG is correct.

The proposed method may be used by any common carrier (including AT&T) that uses SS7 to setup telephone calls. The method significantly improves the caller ID service by identifying switches and TSGs for which caller ID information (i.e., CPNs) are not being received at an intermediate or terminating switch. Using the information provided by this method, a common carrier can proactively identify when problems with caller ID service are due to faulty provisioning at switches owned by other companies, and can work with those companies to correct problems before numerous customer complaints occur. The concept of monitoring initial address messages (IAMs), from switches from which calls originate, to ensure that they contain appropriate information, could additionally be applied to other services requiring certain parameters to be populated, to proactively improve the quality of those services. For example, the Jurisdiction Information parameter, which identifies the geographic origination of a call, is used by terminating networks to perform accurate call rating (e.g., for PCS originated calls). Another example is the Charge Number parameter, which indicates the chargeable number for a call when it is different from the CPN. This parameter can be used to provide a "calling party pays airtime" service for cellular customers. The absence of either of these parameters would prohibit the terminating network from performing the desired service, thus it is useful for the terminating network to accurately determine when the CPN (or any other needed IAM parameter) is not being properly delivered.

Figure 2:
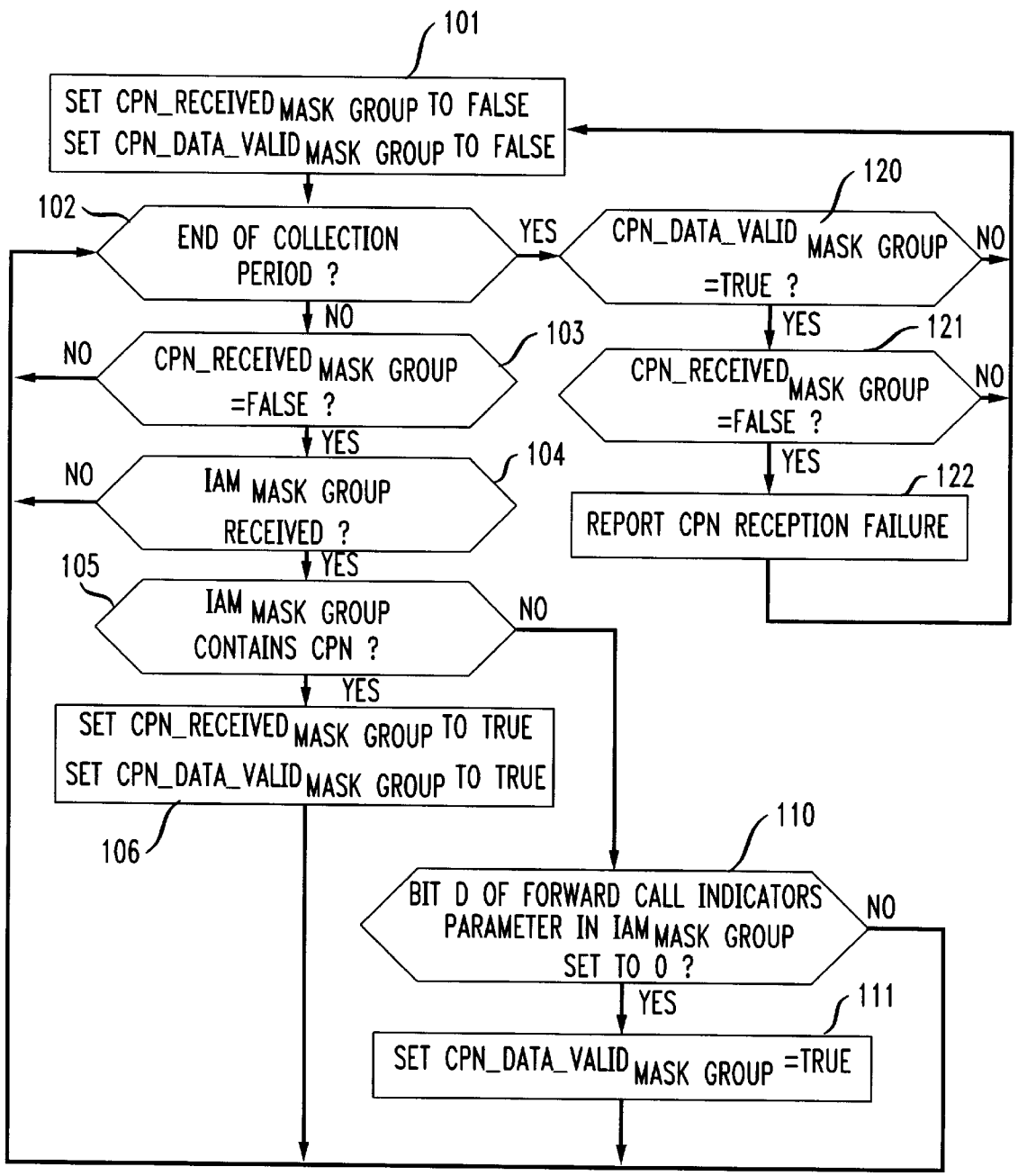
FIG. 2 presents a flow chart of an illustrative process for detecting improper delivery of a CPN from an interconnecting switch.

The operation of the system, incorporating the method of detecting the improper delivery of a CPN, is described with reference to the flowchart shown in FIG. 2. A switch using this method to detect improper CPN delivery maintains two Boolean indicators for each SS7 TSG. The first indicator, $CPN\_RECEIVED_{trunk\ group}$, identifies whether or not a CPN was correctly received for the TSG during the soaking interval. The second indicator, $CPN\_DATA\_VALID_{trunk\ group}$ identifies whether the $CPN\_RECEIVED_{trunk\ group}$, indicator is valid at a given point in time.

As shown at step 101, the switch has reset the parameter $CPN\_RECEIVED_{trunk\ group}$ to "FALSE" and also has reset the parameter $CPN\_DATA\_VALID_{trunk\ group}$ to "FALSE" at the beginning of a collection period.

In step 102, a determination is made as to whether it is the end of the collection period. If a determination is made that it is not the end of the collection period, in step 103, a determination is made as to whether $CPN\_RECEIVED_{trunk\ group}$ is FALSE. If not, and $CPN\_RECEIVED_{trunk\ group}$ is TRUE, the process returns to step 102. If so however, in step 104 a determination is made as to whether an IAM has been received on the tested trunk group. Once again, if not, the process returns to step 102. However, if so, in step 105 a determination is made as to whether the $IAM_{trunk\ group}$ contains a CPN. If so, in step 106 $CPN\_RECEIVED_{trunk\ group}$ is set to TRUE and $CPN\_DATA\_VALID_{trunk\ group}$ is set to TRUE. The process the returns to step 102, and no additional action is taken until the end of the collection period.

If in step 105 a determination was made that the $IAM_{trunk\ group}$ did not contain a CPN, in step 110 a determination is made as to whether Bit D of the forward call indicators parameter in the $IAM_{trunk\ group}$ is set to zero (0). If it is set to zero, it is an indication that it has not encountered MF interworking, and therefore a CPN could have been included in the $IAM_{trunk\ group}$. Accordingly, in step 111, $CPN\_DATA\_VALID_{trunk\ group}$ is set to TRUE and the process returns to step 102. If in step 110 a determination was made that Bit D was not set to zero indicating that it has encountered MF interworking, the process returns directly to step 102, since it would not be possible to pass CPN in this case.

Returning to step 102, if a determination is made that it is the end of the collection period, the process proceeds to step 120, where a determination is made whether $CPN\_DATA\_VALID_{trunk\ group}$ is TRUE. If not, the process returns to step 101. If so, the process proceeds to step 121 where a determination is made whether $CPN\_RECEIVED_{trunk\ group}$ is FALSE. Once again, if not, the process returns to step 101. If however, $CPN\_DATA\_VALID_{trunk\ group}$ is TRUE, and, $CPN\_RECEIVED_{trunk\ group}$ is FALSE, in step 122 a CPN reception failure is reported after which the process returns to step 101 in which the switch again resets both $CPN\_RECEIVED_{trunk\ group}$ and $CPN\_DATA\_VALID_{trunk\ group}$ to FALSE.

The CPN reception failure information, sent to a designated channel, may include the common language location identifier (CLLI) code of the testing switch, the TSG number of the incorrectly provisioned TSG, and the CLLI code of the switch under test.

It should be noted that although a preferred embodiment of the invention is described in detail above, specifically with regard to receiving a CPN IAM parameter, various modifications could also be incorporated into the disclosed application without departing from the spirit and scope of the invention.

What is claimed is:

1. A method of detecting improper delivery of an initial address message (IAM) parameter, from an interconnecting switch under test, connected to a testing switch, the method comprising the steps of:

setting a collection period of time;

identifying the interconnecting switch under test and an SS7 trunk subgroup (TSG) connecting the testing switch to the interconnecting switch under test; and obtaining data indicating if an IAM parameter under test is present in an IAM received from the interconnecting switch under test for a call originating over the SS7 TSG within the collection period of time.

2. A method of detecting improper delivery of an initial address message (IAM) parameter, according to claim 1, wherein, if an indication is obtained that the IAM parameter under test is present in any IAM received from the interconnecting switch under test for calls originating over the SS7 TSG within the collection period of time, no additional monitoring of IAMs for the SS7 TSG occurs during the collection period of time.

3. A method of detecting improper delivery of an initial address message (IAM) parameter, according to claim 1, wherein, if an indication is obtained that the IAM parameter under test is not present in all IAMs received from the interconnecting switch under test for calls originating over the SS7 TSG within the collection period of time, additional data is obtained indicating if MF interworking has been encountered.

4. A method of detecting improper delivery of an initial address message (IAM) parameter, according to claim 3, further wherein if an indication is obtained that MF interworking has not been encountered on any IAM received, information identifying the testing switch, SS7 TSG, and the interconnecting switch under test is generated.

5. A method of detecting improper delivery of an initial address message (IAM) parameter, according to claim 4, the method further comprising the step of transmitting the generated information to a designated channel.

6. A method of detecting improper delivery of an initial address message (IAM) parameter, according to claim 1, the method further comprising the step of identifying the parameter under test at the testing switch.

7. A method of detecting improper delivery of an initial address message (IAM) parameter, according to claim 6, wherein the parameter under test is the calling party number (CPN) parameter.

8. A method of detecting improper delivery of an initial address message (IAM) parameter, according to claim 1, wherein the testing switch is a 4ESS™ switch.

9. In a telecommunications system, a method of detecting improper delivery of an initial address message (IAM) parameter, from an interconnecting switch under test, connected to a testing switch, the method comprising the steps of:

setting a collection period of time;

identifying the interconnecting switch under test and an SS7 trunk subgroup (TSG) connecting the testing switch to the interconnecting switch under test; and obtaining data indicating if an IAM parameter under test is present in an IAM received from the interconnecting switch under test for a call originating over the SS7 TSG within the collection period of time, wherein, if an indication is obtained that the IAM parameter under test is present in any IAM received from the interconnecting switch under test for calls originating over the SS7 TSG within the collection period of time, no additional monitoring of IAMs for the SS7 TSG occurs during the collection period of time, wherein, if an indication is obtained that the IAM parameter under test is not present in all IAMs received from the interconnecting switch under test for calls originating over the SS7 TSG within the collection period of time, additional data is obtained indicating if MF interworking has been encountered, and further wherein if an indication is obtained that MF interworking has not been encountered on any IAM received, information identifying the testing switch, SS7 TSG, and the interconnecting switch under test is generated and transmitted to a designated channel.

10. A method of detecting improper delivery of the CPN initial address message (IAM) parameter, from an interconnecting switch under test, connected to a testing switch, the method comprising the steps of:

setting a collection period of time;

identifying the interconnecting switch under test and an SS7 trunk subgroup (TSG) connecting the testing switch to the interconnecting switch under test;

maintaining data by using two Boolean indicators, a first indicator indicating if a CPN was correctly received during the collection period of time for the SS7 TSG, and a second indicator indicating if the first indicator is valid at a given point in time, said data indicating if the CPN IAM parameter is correctly received from the interconnecting switch under test for a call originating over the SS7 TSG within the collection period of time, resetting the two Boolean indicators to FALSE at the beginning of the collection period of time, wherein, if an indication is obtained that the CPN IAM parameter is present in an IAM received from the interconnecting switch under test for a call originating over the SS7 TSG within the collection period of time, the first and second Boolean indicators are both set to TRUE, wherein, if an indication is obtained that the CPN IAM parameter is not present in any IAM received from the interconnecting switch under test for a call originating over the SS7 TSG within the collection period of time, additional data is obtained indicating if MF interworking has been encountered, wherein if an indication is obtained that MF interworking has not been encountered, the second Boolean indicator is set to TRUE and the first Boolean indicator is unchanged, and further wherein if the collection period of time has expired and the first Boolean indicator is set to FALSE and the second Boolean indicator is set to TRUE, information identifying the testing switch, SS7 TSG, and the interconnecting switch under test is generated and transmitted to a designated channel.

* * * * *